US012804787B2

(12) United States Patent
Chen et al.

(10) Patent No.: US 12,804,787 B2
(45) Date of Patent: Nov. 17, 2026

(54) LIGHT CONTROL METHOD AND APPARATUS

(71) Applicant: Wistron Corporation, New Taipei City (TW)

(72) Inventors: Li Wei Chen, New Taipei City (TW); Hsiu Mei Lin, New Taipei City (TW); Chin Hao Hsu, New Taipei City (TW); Hui Chen Lin, New Taipei City (TW); Ming Chiuan Jing, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 94 days.

(21) Appl. No.: 19/023,165

(22) Filed: Jan. 15, 2025

(65) Prior Publication Data

US 2026/0164525 A1 Jun. 11, 2026

(30) Foreign Application Priority Data

Dec. 6, 2024 (TW) ................................ 113147566

(51) Int. Cl.
*H05B 47/16* (2020.01)
*B60Q 1/14* (2006.01)
(Continued)

(52) U.S. Cl.
CPC ............. *H05B 47/16* (2020.01); *B60Q 1/143* (2013.01); *H05B 45/10* (2020.01); *H05B 45/59* (2022.01); *H05B 47/11* (2020.01); *H05B 47/125* (2020.01); *B60Q 2300/112* (2013.01); *B60Q 2300/314* (2013.01); *B60Q 2300/41* (2013.01)

(58) Field of Classification Search
None
See application file for complete search history.

(56) References Cited

U.S. PATENT DOCUMENTS 5,537,003 A * 7/1996 Bechtel ................ B60Q 1/1423 315/159
6,049,171 A * 4/2000 Stam .................... G06V 20/584 250/214 AL (Continued)

FOREIGN PATENT DOCUMENTS

CN 116872830 10/2023
TW 201605671 2/2016

*Primary Examiner* — Kenneth B Wells
(74) *Attorney, Agent, or Firm* — JCIPRNET

(57) ABSTRACT

A light control method and a light control apparatus are provided. The light control method includes following steps. In response to a first vehicle turning on a lighting source, and in response to detecting that a second vehicle traveling in front of the first vehicle enters a lighting control range corresponding to the lighting source, a brightness of the lighting source is adjusted. After detecting that the second vehicle enters the lighting control range corresponding to the lighting source, in response to detecting that the second vehicle completely leaves the lighting control range, the number of seconds of delay for which the lighting source remains on is obtained based on a relative speed between the first vehicle and the second vehicle and an ambient light brightness; following the obtained number of seconds of delay, the brightness of the lighting source is increased.

10 Claims, 5 Drawing Sheets

(51) Int. Cl.

| | |
|---|---|
| ***H05B 45/10*** | (2020.01) |
| ***H05B 45/59*** | (2022.01) |
| ***H05B 47/11*** | (2020.01) |
| ***H05B 47/125*** | (2020.01) |

(56) References Cited

U.S. PATENT DOCUMENTS

| | | | | |
|---|---|---|---|---|
| 10,279,729 | B2 * | 5/2019 | Futamura ................. | B60Q 1/16 |
| 10,369,923 | B1 | 8/2019 | Chen et al. | |
| 2008/0246404 | A1 * | 10/2008 | Shelton ................ | B60Q 1/1476<br>315/82 |
| 2009/0279317 | A1 * | 11/2009 | Tatara .................... | B60Q 1/143<br>362/465 |

* cited by examiner

LIGHT CONTROL METHOD AND APPARATUS

CROSS-REFERENCE TO RELATED APPLICATION

This application claims the priority benefit of Taiwan application serial no. 113147566, filed on Dec. 6, 2024. The entirety of the above-mentioned patent application is hereby incorporated by reference herein and made a part of this specification.

BACKGROUND

Technical Field

The disclosure relates to a vehicle assistance method and apparatus, and particularly to a light control method and apparatus for adaptive brightness increment.

Description of Related Art

The headlamp of a vehicle serves as the primary source of vision for drivers during nighttime driving. The rapid development of an advanced driver assistance system (ADAS) technology for vehicles has expanded the field of vision for nighttime driving, significantly reducing the occurrence of nighttime accidents and enhancing driving safety. To avoid glare to preceding vehicles when high beams are turned on, an existing technology dictates that the headlamp is immediately turned off when it is determined a preceding vehicle enters the light control range, and the headlamp is then immediately turned on once the preceding vehicle leaves the light control range. However, if the preceding vehicle repeatedly enters and exits the light control range within short intervals, this can cause a flickering phenomenon. That is, when the light is turned on quickly after being turned off, followed by another rapid turn-off and turn-on, it may produce a flickering effect that affects the user's vision. Another existing technology involves immediately turning off the headlamp upon detecting that a preceding vehicle has entered the light control range, and delay the reactivation of the headlamp after the preceding vehicle has left the light control range. However, this approach may not provide sufficient illumination in a timely manner during high-speed driving, raising concerns about potential traffic hazards.

SUMMARY

The disclosure provides a light control method and apparatus that can dynamically determine the timing of turning on light based on a relative speed, so as to ensure an anti-flicker effect and provide necessary and sufficient illumination.

According to an embodiment of the disclosure, a light control method, which controls a lighting source through a processor in a first vehicle, includes the following steps. In response to the lighting source being turned on, and in response to detecting that a second vehicle traveling in front of the first vehicle enters a light control range corresponding to the lighting source, a brightness of the lighting source is reduced. After detecting that the second vehicle enters the light control range corresponding to the lighting source, in response to detecting that the second vehicle completely leaves the light control range, the number of seconds of delay for which the lighting source remains on is obtained based on a relative speed between the first vehicle and the second vehicle and an ambient light brightness. Following the obtained number of seconds of delay, the brightness of the lighting source is increased.

In an embodiment of the disclosure, in response to the lighting source being turned on, the light control method further includes: detecting through a sensor whether the second vehicle traveling in front of the first vehicle enters the light control range corresponding to the lighting source, wherein the sensor is a radar or a camera.

In an embodiment of the disclosure, after detecting that the second vehicle enters the light control range corresponding to the lighting source, the light control method further includes: detecting through a sensor whether the second vehicle completely leaves the light control range.

In an embodiment of the disclosure, in response to detecting that the second vehicle completely leaves the light control range, the light control method further includes: obtaining a first speed of the first vehicle from a controller area network (CAN) bus and obtaining a second speed of the second vehicle from an advanced driver assistance system (ADAS).

In an embodiment of the disclosure, in response to detecting that the second vehicle completely leaves the light control range, the light control method further includes: capturing an image including the second vehicle facing towards a front side of the first vehicle through a camera at each sampling time, obtaining coordinate information of a region of interest where the second vehicle is located in the image through the ADAS, calculating an azimuth difference based on the coordinate information, and calculating the relative speed based on the azimuth difference, the first speed, and the second speed.

In an embodiment of the disclosure, the first vehicle stores an adaptive brightness incremental look-up table, and the step of obtaining the number of seconds of delay for which the lighting source remains on based on the relative speed between the first vehicle and the second vehicle and the ambient light brightness includes: querying the adaptive brightness incremental look-up table based on the relative speed and the ambient light brightness to obtain the number of seconds of delay corresponding to the relative speed and the ambient light brightness.

According to another embodiment of the disclosure, a light control apparatus is installed in a first vehicle to control a lighting source of the first vehicle. The light control apparatus includes a storage device storing a light control program and a processor that is coupled to the storage device and configured to execute a light control program to perform each step of the light control method.

Based on the above, one or more embodiments of the disclosure provides a dynamically adjustable light control mechanism that can control one single lighting source. When the preceding vehicle leaves the light control range, the light is immediately turned on. When the preceding vehicle enters the light control range, an adaptive brightness increment is confirmed based on the relative speed between the preceding vehicle and the subject vehicle. Accordingly, while the anti-flicker effect is guaranteed, the original illumination function of the lighting source can be preserved.

DESCRIPTION OF THE EMBODIMENTS

Figure 1:
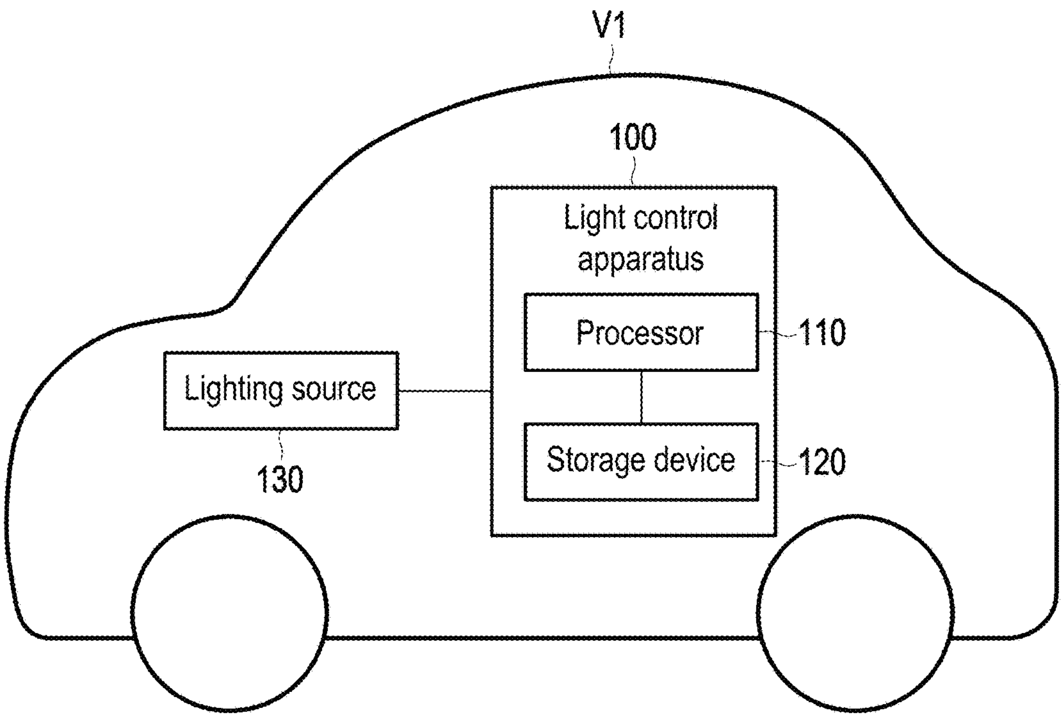
FIG. 1 is a schematic view of a light control apparatus according to an embodiment of the disclosure.

FIG. 1 is a schematic view of a light control apparatus according to an embodiment of the disclosure. With reference to FIG. 1, a light control apparatus 100 includes a processor 110 and a storage device 120. The light control apparatus 100 is installed in a first vehicle V1, and a brightness of a lighting source 130 of the first vehicle V1 is controlled by the light control apparatus 100. The processor 110 is coupled to the storage device 120 and the lighting source 130. For instance, the processor 110 is connected to the lighting source 130 via a connection interface.

The processor 110 is, for instance, a central processing unit (CPU), a physics processing unit (PPU), a programmable microprocessor, an embedded control chip, a digital signal processor (DSP), an application specific integrated circuit (ASIC), or any other similar device.

The storage device 120 can be implemented using any type of fixed or movable random access memory (RAM), read-only memory (ROM), flash memory, secure digital card, hard drive, any other similar device, or a combination of these devices. The storage device 120 stores a light control program (including at least one program code segment), which, after being installed, is executed by the processor 110 to perform the light control method described below.

The lighting source 130 is, for instance, a light-emitting diode (LED). In an embodiment of the disclosure, the vehicle includes two headlamps installed on opposite sides of the front of the vehicle, and the headlamps are illumination lamps used to produce directional light beams towards a driving direction. Each headlamp includes a plurality of the lighting sources 130, and each lighting source 130 has a light control range. Here, an illumination range of the lighting source 130 may be considered as the light control range. The aforementioned headlamps can be implemented in the form of adaptive driving beam (ADB) headlamps.

Besides, the light control apparatus 100 can also be used in any real-time light control mechanism with object detection as an input.

Figure 2A:
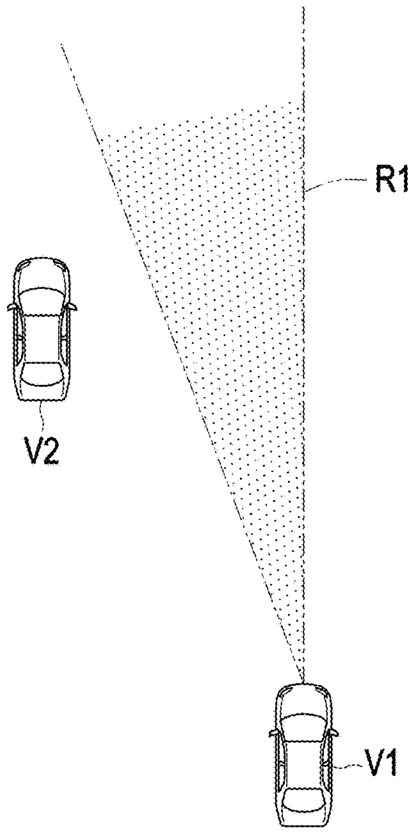
FIG. 2A and FIG. 2B are schematic views of adjusting a brightness of a lighting source according to a preceding vehicle trajectory in an embodiment of the disclosure.
Figure 2B:
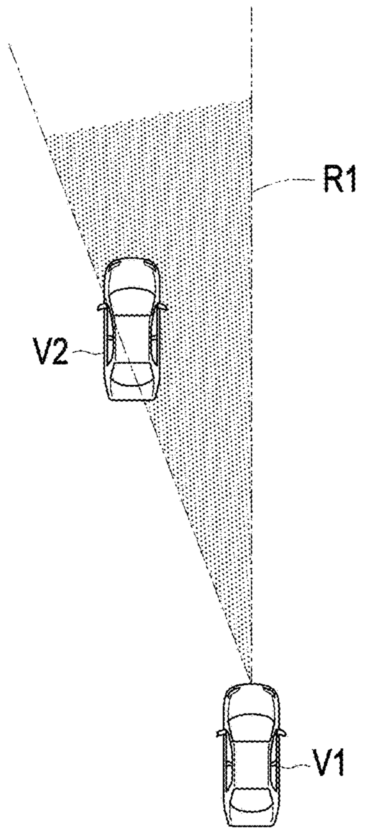

FIG. 2A and FIG. 2B are schematic views of adjusting a brightness of a lighting source according to a preceding vehicle trajectory in an embodiment of the disclosure. In this embodiment, the light control apparatus 100 is installed in the first vehicle (a host vehicle) V1. The lighting source 130 has a corresponding light control range R1. Here, to facilitate understanding, one lighting source 130 is illustrated, which should however not be construed as a limitation in this disclosure, and the first vehicle V1 can include two, three, or more lighting sources 130.

In FIG. 2A, during driving, the first vehicle V1 turns on the lighting source 130, and at this time, there are no other vehicles within the light control range R1 corresponding to the lighting source 130. Accordingly, the light control apparatus 100 controls the brightness of the lighting source 130 to be a first brightness. In FIG. 2B, a second vehicle V2 traveling in front of the first vehicle V1 enters the light control range R1 corresponding to the lighting source 130. At this time, the light control apparatus 100 controls the brightness of the lighting source 130 to be a second brightness. The second brightness is less than the first brightness.

Figure 3:
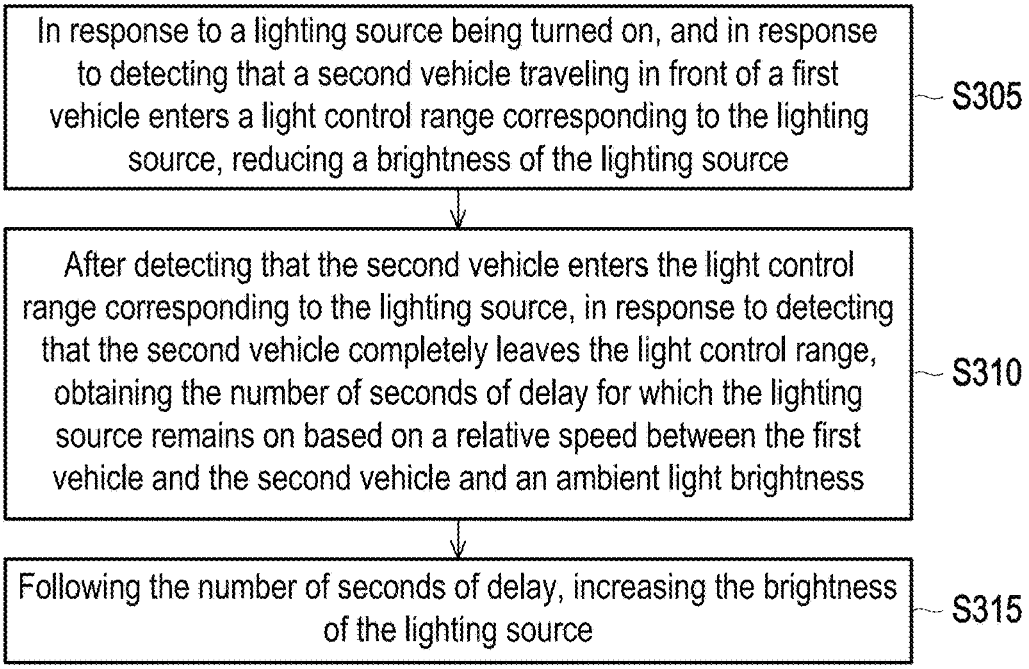
FIG. 3 is a flowchart of a light control method according to an embodiment of the disclosure.

The following steps of the light control method are explained with reference to FIG. 1, FIG. 2A, and FIG. 2B. FIG. 3 is a flowchart of a light control method according to an embodiment of the disclosure. With reference to FIG. 3, in step S305, in response to the lighting source 130 of the first vehicle V1 being turned on (as shown in FIG. 3A), and in response to detecting that the second vehicle V2 traveling in front of the first vehicle V1 enters the light control range R1 corresponding to the lighting source 130 (as shown in FIG. 3B), the brightness of the lighting source 130 is reduced. For instance, the brightness of the lighting source 130 is reduced from the first brightness to the second brightness. For instance, in one embodiment of the disclosure, the first brightness is set to 2000 lux, and the second brightness is set to 500 lux. In another embodiment of the disclosure, the second brightness can also be set to 0 lux; that is, when it is determined that a vehicle enters the light control range R1, the lighting source 130 is turned off.

Next, in step S310, after detecting that the second vehicle V2 enters the light control range R1 corresponding to the lighting source 130, in response to detecting that the second vehicle V2 completely leaves the light control range R1, the number of seconds of delay for which the lighting source 130 remains in the reduced brightness state is obtained based on a relative speed between the first vehicle V1 and the second vehicle V2 and an ambient light brightness.

Subsequently, in step S315, following the number of seconds of delay, the brightness of the lighting source 130 is increased. For instance, assuming the number of seconds of delay for which the lighting source 130 remains in the reduced brightness state is two seconds, the brightness of the lighting source 130 is increased only after counting two seconds from the moment when the second vehicle V2 is detected to have completely left the light control range R1.

Figure 4:
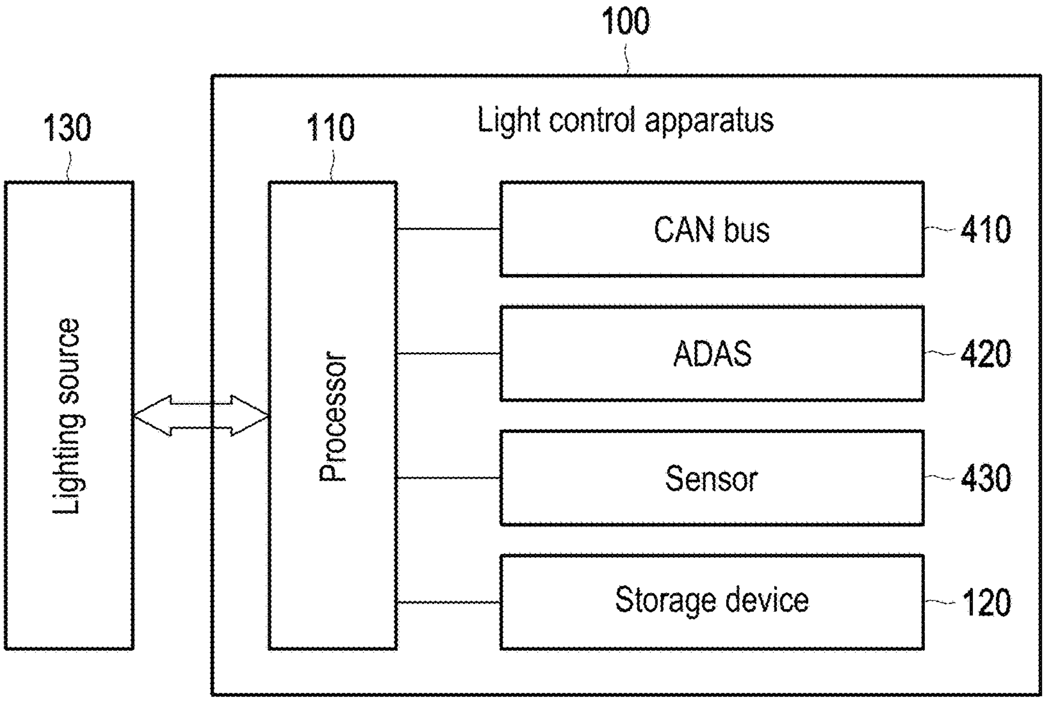
FIG. 4 is a block diagram of a light control apparatus according to an embodiment of the disclosure.

FIG. 4 is a block diagram of a light control apparatus according to an embodiment of the disclosure. This embodiment is an application example of what is shown in FIG. 1. With reference to FIG. 4, the light control apparatus 100 includes a processor 110, a storage device 120, a CAN bus 410, an ADAS 420, and a sensor 430. In other embodiments, the CAN bus 410, the ADAS 420, and the sensor 430 may not be included in the light control apparatus 100.

The CAN bus is a standard for vehicle bus communication designed to allow efficient communication among electronic control units (ECUs). Many devices (parts), ranging from complex electronic control units to simple input/output devices, can be connected to the CAN bus 410. The processor 110 can obtain the first speed of the first vehicle V1 in its current driving state through the CAN bus 410.

The ADAS 420 serves to provide information related to conditions of a vehicle, changes in the external driving environment, and so forth. The operating principle of the ADAS 420 can be divided into: detecting the environment by a sensing element (or a sensor 430), transmitting the environmental information to a microcontroller for analysis, and finally executing actions such as acceleration, braking, and steering. The processor 110 obtains the second speed of the second vehicle V2 in its current driving state through the ADAS 420.

The sensor 430 serves to detect whether a vehicle (such as the second vehicle V2) traveling in front of the first vehicle V1 enters or leaves the light control range R1. The sensor 430 is, for instance, a camera that captures image sequences, which, when combined with the image recognition technology, can determine driving conditions of the preceding vehicle of the first vehicle V1. Additionally, the sensor 430 can also be implemented in the form of radar.

Figure 5:
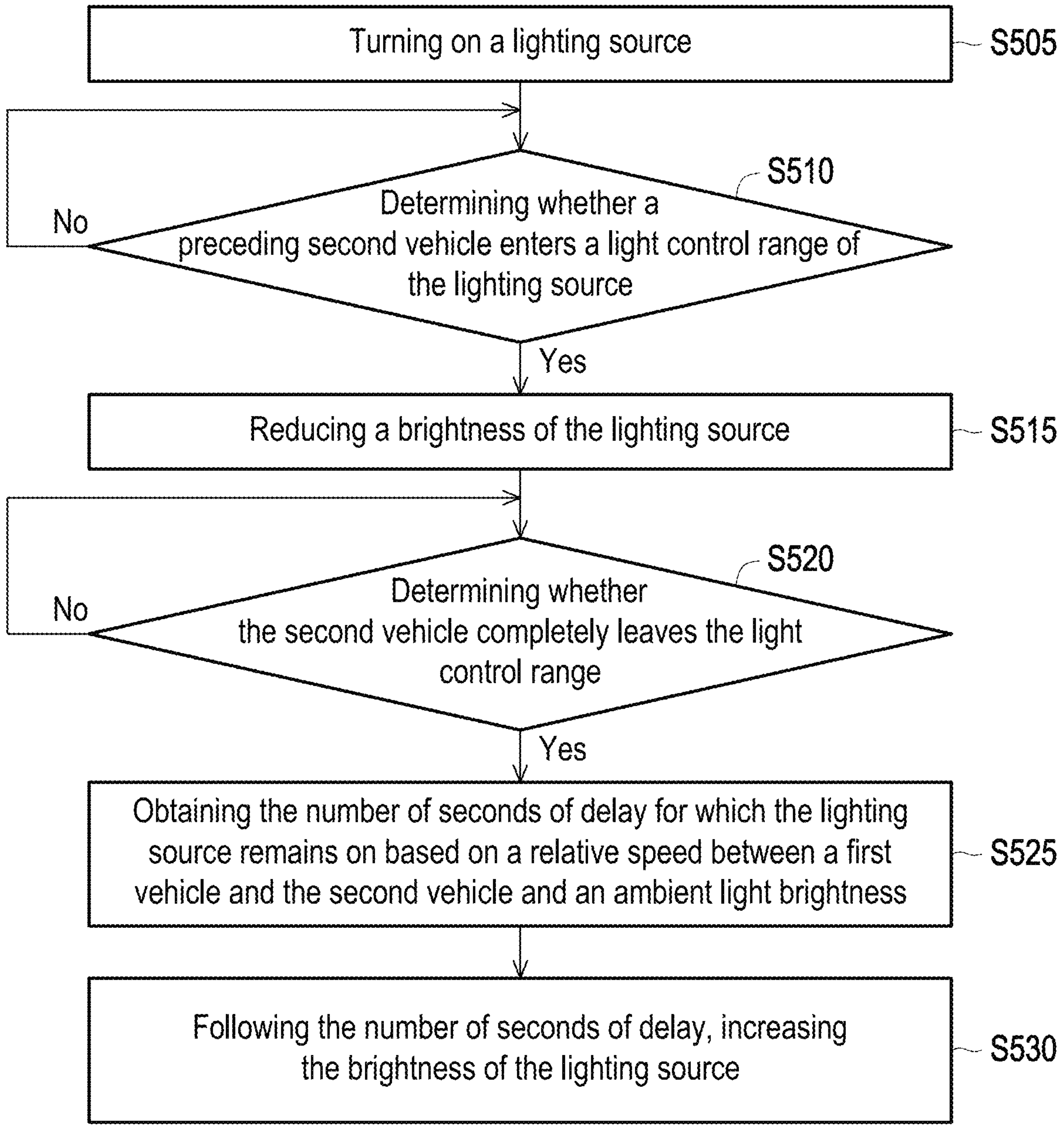
FIG. 5 is a flowchart of a light control method according to an embodiment of the disclosure.

FIG. 5 is a flowchart of a light control method according to an embodiment of the disclosure. With reference to FIG. 5, in step S505, the first vehicle V1 turns on the lighting source 130. For instance, the driver of the first vehicle V1 presses a corresponding button on the control panel to activate the lighting source 130. Alternatively, when the ambient light brightness is below a certain preset value, the lighting source 130 can be directly activated, or the lighting source 130 can be directly activated at a preset time point determined in advance (e.g., at 5 PM every day).

Next, in step S510, it is determined whether the preceding second vehicle V2 enters the light control range R1 of the lighting source 130. For instance, while the lighting source 130 is activated, the sensor 430 is driven to capture image sequences for the processor 110 to determine whether the second vehicle V2 enters the light control range R1. In response to determining that the second vehicle V2 enters the light control range R1, in step S515, the processor 110 reduces the brightness of the lighting source 130. Here, the brightness of the lighting source 130 can be gradually reduced to a preset brightness, or the brightness of the lighting source 130 can be immediately adjusted to the preset brightness.

After reducing the brightness of the lighting source 130, when the second vehicle V2 is within the light control range R1, in step S520, it is determined whether the second vehicle V2 completely leaves the light control range R1. For instance, the processor 110 continuously drives the sensor 430 to capture the image sequences for the processor 110 to determine whether the second vehicle V2 completely leaves the light control range R1.

When it is determined that the second vehicle V2 has completely left the light control range R1, in step S525, the number of seconds of delay for which the lighting source 130 remains in the reduced brightness state is obtained based on the relative speed between the first vehicle V1 and the second vehicle V2 and the ambient light brightness. Subsequently, in step S530, following the obtained number of seconds of delay, the brightness of the lighting source 130 is increased. The closer the relative speed between the two vehicles, the less compensation is required to reduce the flicker effect; conversely, when the difference in the relative speed between the two vehicles is significant, minimizing the flicker effect becomes more critical. Accordingly, a smaller relative speed results in fewer seconds of delay, while a larger relative speed necessitates a greater number of seconds of delay.

In an embodiment of the disclosure, when it is determined that the second vehicle V2 has completely left the light control range R1, the processor 110 obtains a first speed v (km/hour) of the first vehicle V1 from the CAN bus 410 and obtains a second speed $v_n$ (km/hour) of the second vehicle V2 from the ADAS 420. Subsequently, the relative speed is calculated based on the first speed and the second speed.

In an embodiment of the disclosure, an image including the second vehicle V2 and facing towards the front of the first vehicle V1 is captured by a camera at each sampling time. When a camera is used to implement the sensor 430, the sensor 430 can directly capture an image including the second vehicle V2 and facing towards the front of the first vehicle V1 at each sampling time. Then, coordinate information of a region of interest where the second vehicle V2 is located in the image is obtained through the ADAS 420. For instance, a bounding box is applied to frame the region of interest, and the coordinates of the four corners of the bounding box serve as the coordinate information of the region of interest. The coordinate information includes the coordinates of the top-left corner, the top-right corner, the bottom-left corner, and the bottom-right corner of the bounding box corresponding to $(x_1, y_1)$, $(x_2, y_2)$, $(x_3, y_3)$, and $(x_4, y_4)$, respectively. Subsequently, an azimuth difference θ is calculated based on the coordinate information. According to the aforementioned coordinate information, a horizontal distance $d_x$ (unit: meters) and a longitudinal distance $d_y$ (unit: meters) are calculated, and the azimuth difference $\theta=\tan^{-1}(d_x, d_y)$>.

Subsequently, the relative speed is calculated based on the azimuth difference θ, the first speed v, and the second speed $v_n$. Here, the relative speed includes the longitudinal (i.e., in the travel direction of the first vehicle V1) relative vehicle speed $v_{rh}$ (km/hour) and the lateral relative speed $v_{rv}$ (km/hour), which are calculated according to the following formulas (1) and (2), respectively.

$$v_{rh} = v\times\cos(\theta) - v_n\times\cos(\theta) \tag{1}$$

$$v_{rv} = v\times\sin(\theta) - v_n\times\sin(\theta) \tag{2}$$

For instance, if it is assumed the first speed v is 58 km/h, the second speed $v_n$ is 59 km/h, the horizontal distance $d_x$ is 10 meters, the longitudinal distance $d_y$ is 3 meters, and the azimuth difference θ is 16.7 degrees, then the calculated longitudinal relative vehicle speed $v_{rh}$ and lateral relative speed $v_{rv}$ are −0.96 and −0.29, respectively. The negative sign indicates that the first speed is slower than the second speed.

In this embodiment, it is likely to simply use the lateral relative speed to obtain the number of seconds of delay for which the lighting source 130 remains in the reduced brightness state. In one embodiment of the disclosure, an adaptive brightness incremental look-up table is stored in the first vehicle V1. The processor 110 queries the adaptive brightness incremental look-up table based on the relative speed (e.g., the lateral relative speed vrv) and the ambient light brightness to obtain the corresponding number of seconds of delay for which the lighting source 130 remains in the reduced brightness state. For instance, Table 1 shows an example of the adaptive brightness incremental look-up table. The difference in the ambient light brightness leads to the difference in the number of seconds of delay for which the lighting source 130 remains in the reduced brightness state. When the ambient light brightness is relatively high, the number of seconds τ of delay for which the lighting source 130 remains in the reduced brightness state is relatively high.

TABLE 1

| Lateral relative speed $_{rv}\lvert v_{rv}\rvert$ | Ambient light brightness < 1000 lux Number of seconds τ of delay | Ambient light brightness ≥ 1000 lux Number of seconds τ of delay |
|---|---|---|
| 0 | 0.1 | 0.5 |
| 1 | 0.17 | 0.625 |
| 2 | 0.24 | 0.75 |
| 3 | 0.31 | 0.875 |
| 4 | 0.38 | 1 |
| 5 | 0.45 | 1.125 |
| 6 | 0.52 | 1.25 |
| 7 | 0.59 | 1.375 |
| 8 | 0.66 | 1.5 |
| 9 | 0.73 | 1.625 |
| 10 | 0.8 | 1.75 |
| . . . | . . . | . . . |
| 18 | 1.36 | 2.75 |
| 19 | 1.43 | 2.875 |
| 20 | 1.5 | 3 |
| >20 | 1.5 | 3 |

The adaptive brightness incremental look-up table is determined based on existing standards to decide the time interval for delaying the number of seconds for which the lighting source 130 remains in the reduced brightness state. For instance, according to the European Union ECE R48 regulations on installation of lights, it stipulates: when the ambient light brightness is <1000 lux, the headlamps (the low beam) of a vehicle must be turned on within two seconds; when the ambient light brightness is >7000 lux, the headlamps (the low beam) must be automatically turned off within 5 to 300 seconds. Additionally, based on the SAE J3069 standard, when a sensor detects a preceding vehicle and needs to perform partial dimming or turn on the lighting source, the response time for turning on the light source should be ≤2.5 seconds, whereby the time interval for delaying the number of seconds for which the lighting source remains in the reduced brightness state is set as follows: when the ambient light brightness is <1000 lux, the minimum number of seconds τmin of delay for which the lighting source remains in the reduced brightness state is 0.1 second, and the maximum number of seconds τmax of delay for which the lighting source remains in the reduced brightness state is 1.5 seconds; when the ambient light brightness is ≥1000 lux, the minimum number of seconds τmin of delay for which the lighting source remains in the reduced brightness state is 0.5 second, and the maximum number of seconds max of delay for which the lighting source remains in the reduced brightness state is 3 seconds.

In an extreme situation, i.e., assuming the preceding vehicle crosses a distance of about two lanes (approximately 6 meters) in one second, and longitudinal movement is ignored, the lateral relative vehicle speed is approximately 20 km/h. That is, the maximum relative speed $v_{max}$=20 km/h. Besides, if it is assumed the preceding vehicle and the subject vehicle are traveling at the same speed, then the minimum relative speed $v_{min}$=0 km/h. When the ambient light brightness is <1000 lux, $\tau_{max}$=1.5, $\tau_{min}$=0.1, $v_{max}$=20 km/h, and $v_{min}$=0 km/h, following formulas (3) and (4) are applied to obtain the maximum self-adaptive anti-flicker coefficient $\mu_{max}$ and the minimum self-adaptive anti-flicker coefficient $\mu_{min}$.

$$\tau_{min} = \tau_{min} + (\tau_{max} - \tau_{min}) \times \frac{|v_{rv}|}{v_{max}} \times (1 - \mu_{min}) \tag{3}$$

-continued $$\tau_{max} = \tau_{min} + (\tau_{max} - \tau_{min}) \times \frac{|v_{rv}|}{v_{max}} \times (1 - \mu_{max}) \tag{4}$$

Additionally, the adopted maximum relative speed $v_{max}$ may vary for different road sections, such as urban roads and highways. For instance, when driving on urban roads where the maximum speed limit is relatively low, the adopted maximum relative speed $v_{max}$ is relatively low, e.g., 5 km/h. While driving on highways where the maximum speed limit is relatively high, the adopted maximum relative speed $v_{max}$ is relatively high, e.g., 20 km/h. Besides, different regions in different countries may have varying restrictions on the maximum speed limit, and accordingly corresponding adjustments may be made.

After the maximum self-adaptive anti-flicker coefficient μmax and the minimum self-adaptive anti-flicker coefficient μmin are obtained, a linear equation can be established based on the maximum self-adaptive anti-flicker coefficient μmax and the minimum relative speed vmin, as well as the minimum self-adaptive anti-flicker coefficient μmin and the maximum relative speed vmax, so as to obtain the self-adaptive anti-flicker coefficients corresponding to multiple relative speeds between vmin and vmax. Moreover, another linear equation can be established based on the maximum relative speed vmax and the maximum number of seconds τmax of delay for which the lighting source 130 remains in the reduced brightness state, as well as the minimum relative speed vmin and the minimum number of seconds τmin of delay for which the lighting source remains in the reduced brightness state, so as to obtain the number of seconds of delay corresponding to multiple relative speeds between vmin and vmax.

Figure 6:
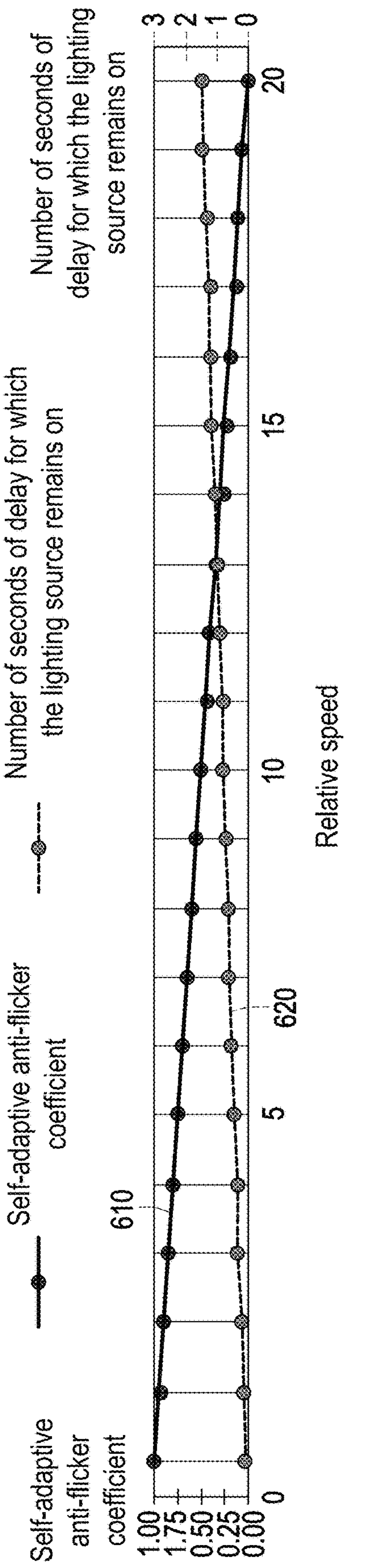
FIG. 6 is a schematic view of an adaptive incremental curve when an ambient light brightness is <1000 lux according to an embodiment of the disclosure.

FIG. 6 is a schematic view of an adaptive incremental curve when an ambient light brightness is <1000 lux according to an embodiment of the disclosure. With reference to FIG. 6, in this embodiment, a curve 610 is obtained based on the maximum self-adaptive anti-flicker coefficient μmax=1 and the minimum self-adaptive anti-flicker coefficient μmin=0, while a curve 620 is obtained based on the maximum number of seconds τmax=1.5 of delay for which the lighting source remains in the reduced brightness state and the minimum number of seconds τmin=0.1 of delay for which the lighting source remains in the reduced brightness state. Based on the curve 620, Table 1 shows the number of seconds t of delay for which the lighting source remains in the reduced brightness state, corresponding to multiple lateral relative speeds when the ambient light brightness is <1000 lux.

Figure 7:
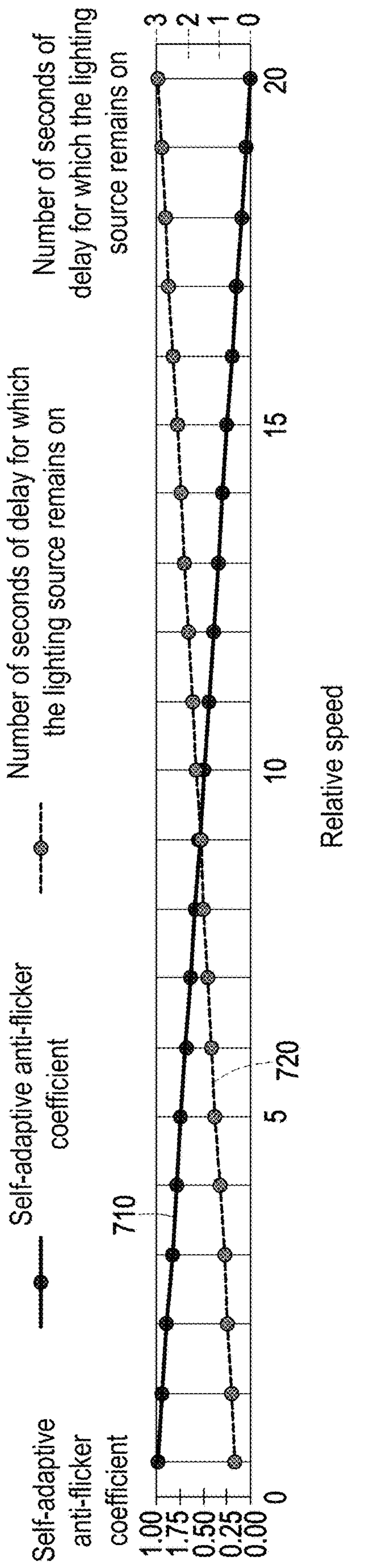
FIG. 7 is a schematic view of an adaptive incremental curve when the ambient light brightness is ≥1000 lux according to an embodiment of the disclosure.

FIG. 7 is a schematic view of an adaptive incremental curve when the ambient light brightness is ≥1000 lux according to an embodiment of the disclosure. With reference to FIG. 7, in this embodiment, a curve 710 is obtained based on the maximum self-adaptive anti-flicker coefficient μmax=1 and the minimum self-adaptive anti-flicker coefficient μmin=0, while a curve 720 is obtained based on the maximum number of seconds τmax=3.0 of delay for which the lighting source remains in the reduced brightness state and the minimum number of seconds τmin=0.5 of delay for which the lighting source remains in the reduced brightness state. Based on the curve 720, Table 1 shows the number of seconds t of delay for which the lighting source remains in the reduced brightness state, corresponding to multiple lateral relative speeds when the ambient light brightness is ≥1000 lux.

The X-axis in FIG. 6 and FIG. 7 represents the relative speed, e.g., the lateral relative speed $v_{r_v}$. From FIG. 6 and FIG. 7, the adaptive brightness incremental look-up table shown in Table 1 can be obtained.

In other embodiments of the disclosure, the curves 610 and 710 can also be directly applied to obtain the self-adaptive anti-flicker coefficient μ corresponding to multiple lateral relative speeds. After the lateral relative vehicle speed $|v_{r_v}|$ is obtained, the current lateral relative vehicle speed $|v_{r_v}|$ and its corresponding self-adaptive anti-flicker coefficient μ can be substituted into the calculation formula to calculate the number of seconds τ of delay for which the lighting source remains on in real-time.

Figure 8:
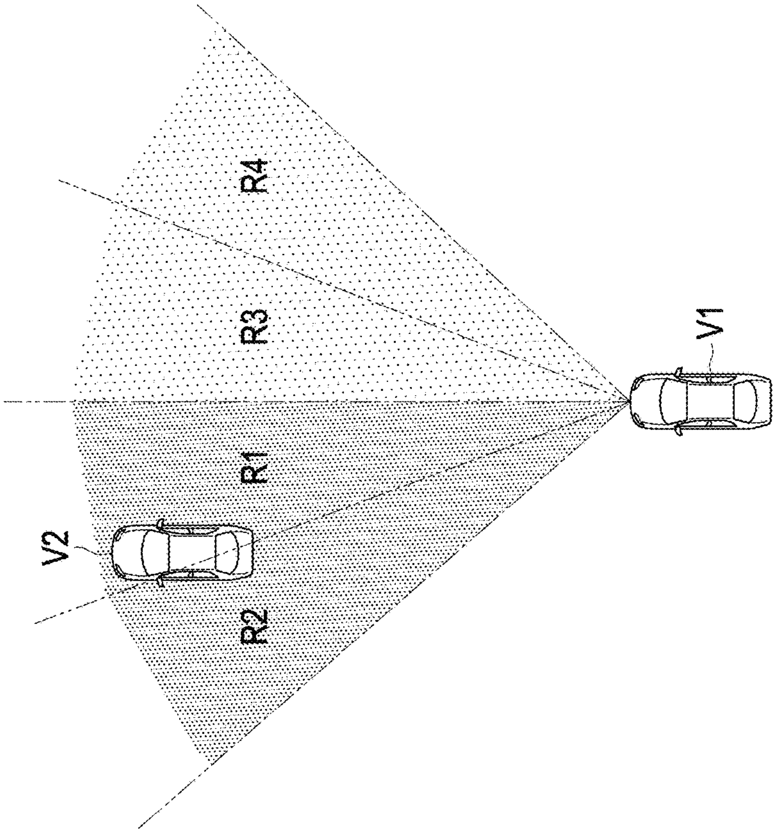
FIG. 8 is a schematic view of adjusting a brightness of the lighting source according to a preceding vehicle trajectory in an embodiment of the disclosure.

FIG. 8 is a schematic view of adjusting a brightness of the lighting source according to a preceding vehicle trajectory in an embodiment of the disclosure. With reference to FIG. 8, in this embodiment, the first vehicle V1 is described as having four lighting sources 130. The four lighting sources 130 correspond to light control ranges R1 to R4, respectively. In the embodiment shown in FIG. 8, the second vehicle V1 enters the light control ranges R1 and R2. In response thereto, the brightness of the two lighting sources 130 corresponding to the light control ranges R1 and R2 is reduced, while the brightness of the other two lighting sources 130 corresponding to the light control ranges R3 and R4 is not adjusted.

Figure 9:
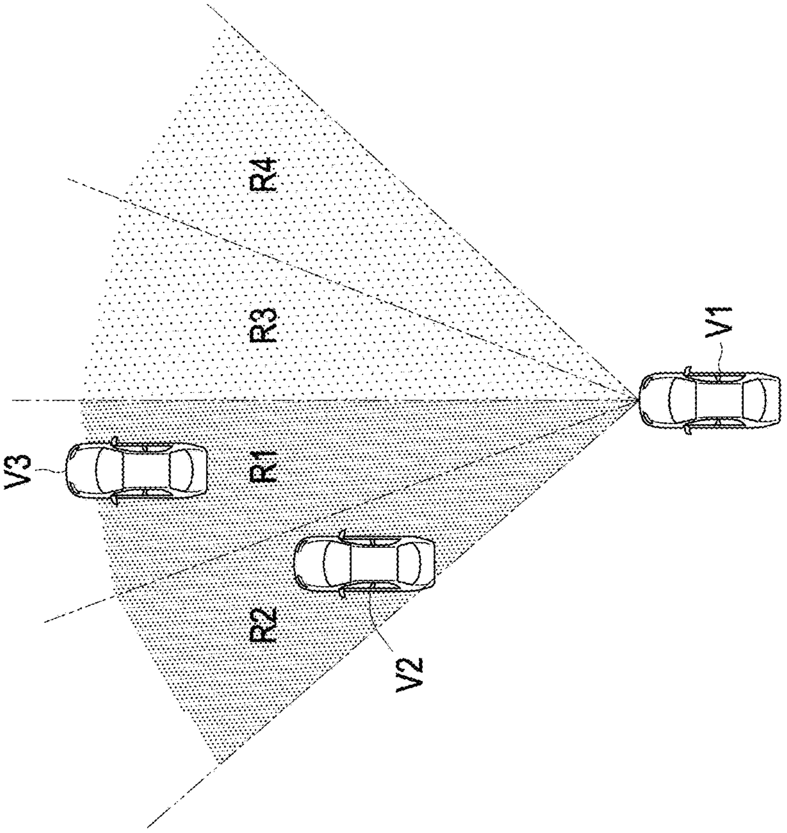
FIG. 9 is a schematic view of adjusting a brightness of the lighting source according to a preceding vehicle trajectory in an embodiment of the disclosure.

FIG. 9 is a schematic view of adjusting a brightness of the lighting source according to a preceding vehicle trajectory in an embodiment of the disclosure. With reference to FIG. 9, in this embodiment, the first vehicle V1 is described as having four lighting sources 130. The four lighting sources 130 correspond to light control ranges R1 to R4, respectively. In the embodiment shown in FIG. 9, there are a second vehicle V2 and a third vehicle V3 in front of the first vehicle V1. The second vehicle V2 enters the light control range R2, and the third vehicle V3 enters the light control range R1. In response thereto, the brightness of the two lighting sources 130 corresponding to the light control ranges R1 and R2 is reduced, while the brightness of the other two lighting sources 130 corresponding to the light control ranges R3 and R4 is not adjusted.

To sum up, a dynamic light control mechanism that can control individual lighting sources is provided in one or more embodiments of the disclosure. When a preceding vehicle enters the light control range of each lighting source, the light is immediately dimmed or turned off. When the preceding vehicle leaves the light control range, the brightness is incrementally increased based on the relative speed between the preceding vehicle and the subject vehicle. Accordingly, the flicker effects can be prevented, and the original illumination function of the lighting source can be ensured. The timing of brightness increment can be dynamically adjusted according to the speed of the preceding vehicle. Specifically, when the preceding vehicle leaves the light control range at a relatively high speed, a longer delay occurs before the brightness is incremented; when the preceding vehicle leaves the light control range at a relatively low speed, a shorter delay precedes the brightness increment.

In one or more embodiments of the disclosure, complex algorithms are not required, and mathematical formulas can serve to obtain the adaptive brightness incremental look-up table, which can smoothly control brightness changes and avoid flicker. Accordingly, in one or more embodiments of the disclosure, complex digital signal processing (DSP) denoising algorithms, e.g., Fourier transforms, are not necessary. The adaptive brightness incremental look-up table obtained through pre-calculation is stored and can be applied to all real-time systems, and there is no need to set up a buffer to store real-time data for calculations, nor is there a need for vehicle trajectory analysis and denoising. As a result, subsequent calculation time can be saved, and the number of seconds of delay for which the lighting source remains in the reduced brightness state can be quickly obtained.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light control method for controlling a lighting source through a processor in a first vehicle, comprising:

in response to the lighting source being turned on, and in response to detecting that a second vehicle traveling in front of the first vehicle has entered a light control range corresponding to the lighting source, reducing a brightness of the lighting source;

after detecting that the second vehicle has entered the light control range corresponding to the lighting source, in response to detecting that the second vehicle has completely left the light control range, obtaining a number of seconds of delay for which the lighting source remains in the reduced brightness state based on a relative speed between the first vehicle and the second vehicle and an ambient light brightness, wherein the first vehicle stores an adaptive brightness incremental look-up table, and the step of obtaining the number of seconds of delay for which the lighting source remains in the reduced brightness state comprises:

querying the adaptive brightness incremental look-up table based on the relative speed and the ambient light brightness to obtain the number of seconds of delay corresponding to the relative speed and the ambient light brightness; and after counting the obtained number of seconds of delay, increasing the brightness of the lighting source.

2. The light control method according to claim 1, wherein in response to the lighting source being turned on, the light control method further comprises:

detecting, using a sensor, whether the second vehicle traveling in front of the first vehicle has entered the light control range corresponding to the lighting source, wherein the sensor is a radar or a camera.

3. The light control method according to claim 2, wherein after detecting that the second vehicle has entered the light control range corresponding to the lighting source, the light control method further comprises:

detecting, using the sensor, whether the second vehicle has completely left the light control range.

4. The light control method according to claim 1, wherein in response to detecting that the second vehicle has completely left the light control range, the light control method further comprises:

obtaining a first speed of the first vehicle from a controller area network bus; and obtaining a second speed of the second vehicle from an advanced driver assistance system.

5. The light control method according to claim 4, wherein in response to detecting that the second vehicle has completely left the light control range, the light control method further comprises:

capturing an image comprising the second vehicle facing towards a front side of the first vehicle using a camera at each of a plurality of sampling times;

obtaining coordinate information of a region of interest where the second vehicle is located in the image using the advanced driver assistance system;

calculating an azimuth difference based on the coordinate information; and calculating the relative speed based on the azimuth difference, the first speed, and the second speed.

6. A light control apparatus, installed in a first vehicle to control a lighting source of the first vehicle, comprising:

a storage device for storing a light control program; and a processor coupled to the storage device and configured to execute the light control program to:

in response to the lighting source being turned on, and in response to detecting that a second vehicle traveling in front of the first vehicle has entered a light control range corresponding to the lighting source, reduce the brightness of the lighting source;

in response to the lighting source being turned off due to the second vehicle having entered the light control range corresponding to the lighting source, and in response to detecting that the second vehicle has completely left the light control range, obtain a number of seconds of delay for which the lighting source remains in the reduced brightness state based on the relative speed between the first vehicle and the second vehicle and an ambient light brightness, wherein a look-up table is stored in the first vehicle, and the process of obtaining the number of seconds of delay for which the lighting source remains in the reduced brightness state comprises:

querying the look-up table based on the relative speed and the ambient light brightness to obtain the number of seconds of delay corresponding to the relative speed and the ambient light brightness; and after counting the obtained number of seconds of delay, increase the brightness of the lighting source.

7. The light control apparatus according to claim 6, wherein in response to the lighting source being turned on, the processor is configured to:

detect whether the second vehicle traveling in front of the first vehicle has entered the light control range corresponding to the lighting source through a sensor, wherein the sensor is a radar or a camera.

8. The light control apparatus according to claim 7, wherein after detecting that the second vehicle has entered the light control range corresponding to the lighting source, the processor is configured to:

detect whether the second vehicle has completely left the light control range through the sensor.

9. The light control apparatus according to claim 6, wherein in response to detecting that the second vehicle has completely left the light control range, the processor is configured to:

obtain a first speed of the first vehicle from a controller area network; and obtain a second speed of the second vehicle from an advanced driver assistance system.

10. The light control apparatus according to claim 9, wherein in response to detecting that the second vehicle has completely left the light control range, the processor is configured to:

capture an image comprising the second vehicle facing towards a front side of the first vehicle using a camera at each of a plurality of sampling times;

obtain coordinate information of a region of interest where the second vehicle is located in the image from the advanced driver assistance system;

calculate an azimuth difference based on the coordinate information;

calculate the relative speed based on the azimuth difference, the first speed, and the second speed.

* * * * *